Nov. 27, 1928.  1,693,011

R. C. WOODWARD

METHOD OF PERFORATING CASINGS

Filed Sept. 28, 1925

Inventor
Richard C. Woodward.
By Lyon & Lyon
Attorney

Patented Nov. 27, 1928.

1,693,011

UNITED STATES PATENT OFFICE.

RICHARD C. WOODWARD, OF LOS ANGELES, CALIFORNIA, ASSIGNOR TO McEVOY WIRELESS WELL STRAINER CORPORATION, OF LOS ANGELES, CALIFORNIA, A CORPORATION OF CALIFORNIA.

METHOD OF PERFORATING CASINGS.

Application filed September 28, 1925. Serial No. 59,231.

This invention relates to well screens, such as are employed in oil or water wells to prevent sand or other débris entering the well with the oil or water, and refers, also to the method and means for forming such screen.

Well screens which are employed in oil wells are particularly required to have their screening openings of uniform size to affect the most efficient separation of the oil from the oil-bearing sand and the casing provided with such openings must possess considerable strength or resistance to collapsing.

The art has hitherto had considerable difficulty in providing a well screen of sufficient strength against collapsing while still providing the correct character of screening openings at a relatively low cost.

In the copending application of Milon C. Trumble, for well screen and method and apparatus of forming the same and other well products, filed October 12, 1925, Serial No. 62,190, there is described a well screen and method and means for its manufacture in which the production or formation of the screening openings is accompanied by a cold pressing of the metal of the casing so that the metal surrounding the openings is hardened and a resulting well screen produced which satisfies the requirement of great strength to collapsing action. Moreover, the well screen of such copending application is in one integral piece and can be produced at a relatively low cost.

The general object of the present invention is to provide a well screen and method and apparatus for forming the same which well screen is provided with a more uniform opening than can generally be produced in accordance with the method and apparatus of said copending application and further to provide a well screen the size of the openings of which will be maintained uniform even after considerable wear and use in the well.

Another object of the present invention is to provide a method and means for forming well screens which will enable the formation of the aforedescribed improved screen in one punching operation and thus eliminate the necessity of a subsequent milling or grinding operation as was generally employed with the method and apparatus of the aforesaid copending application.

Various other advantages and objects of the invention will be apparent from the description of the preferred well screen and the method and means for producing the same for which purpose reference is made to the accompanying drawings in which a preferred embodiment of the invention is illustrated.

Figure 1:
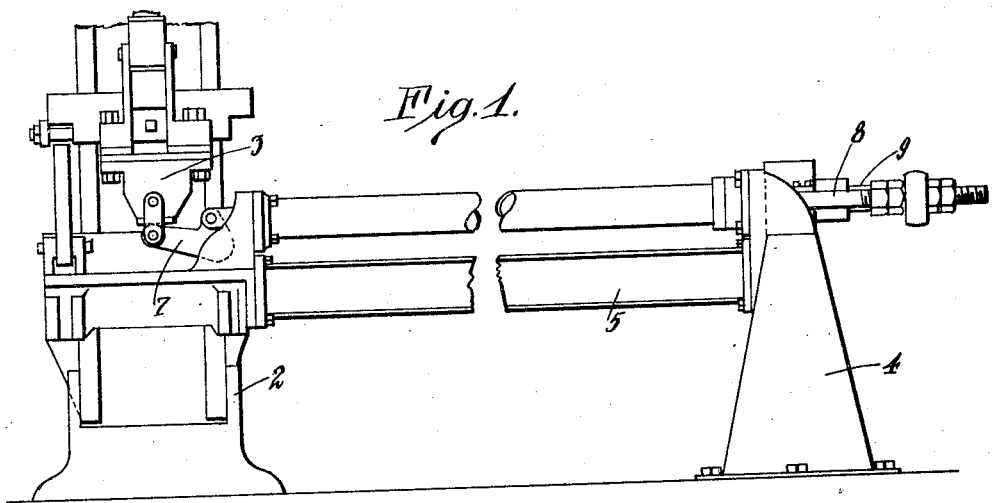
Fig. 1 is a front elevation of a well screen perforating apparatus.

Referring to the drawings, the general type of well screen perforating apparatus is that described in the copending application of Milon C. Trumble and Richard C. Woodward, apparatus for treating casings, filed September 28, 1925, Serial No. 59,246, it being understood that the present invention is not limited to any particular type of punching apparatus and that the illustration of such Trumble and Woodward apparatus is merely for the purpose of facilitating a description of the present invention. Such apparatus generally comprises a punch press 2 provided with a reciprocating ram 3. To one side of the press is mounted a foot stock 4 rigidly held to the press by I-beams 5. The ram 3 holds a die 6 and is connected by a rocker 7 to rods 8 extending to the rear of the foot stock 4 and there connected to a punch actuating rod 9. The punch actuating rod 9 extends from the foot stock 4 through a casing 10 to a position beneath the ram 3 of the apparatus. The casing 10 there terminates in a head 11 mounting a punch member 12 so that said member may reciprocate in a vertical direction and the rod 9 is connected by a toggle joint 13 to cause the upward motion of such punch member, pawls 14 and 15 being provided for retracting the punch member from the upper or punching position. Thus with such apparatus the die 6 and punch member 12 may be automatically, simultaneously, or jointly operated to actuate the punch and die in unison and the motion of these members is automatically timed. However, the punch member 12 and die 6 may be actuated by separate means or any other means as desired, the present invention being concerned with the particular method and means by which the resulting perforations are brought to a uniform size and in one perforating operation and to the well casing produced, the perforations of which are of uniform size and which will retain their uniform size even after substantial wear of the casing.

Figure 5:
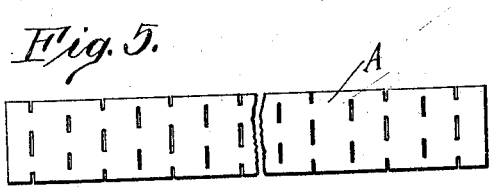
Fig. 5 is a view of the finished well casing.

In order to accomplish the object of this invention, the punch member 12 is provided with a punch proper 16 preferably elongated to form slots in the casing A to be perforated, as appears from Fig. 5, the top of such punch proper 16 being provided with straight or parallel walls 17 for a substantial portion of the depth of such punch member and the base of the punch proper tapers from such straight or parallel tip 17 as indicated at 18. The die 16 is provided with an upwardly expanding opening 19, the lower end of which is but slightly larger than the straight walled tip end of the punch proper 16.

By this construction of the die 6 and punch 16 it is possible to form perforations in the casing A in a single operation which perforations will be of uniform size and there will be no requirements of any subsequent milling or grinding operation to finish the casing. This is primarily due to the employment of a punch 16 with the straight walled tip 17 which permits the joint use with such punch of the die 6, the opening of which closely corresponds with the width of the tip 17.

Where a punch is employed tapering throughout its length, a die cannot be employed in connection therewith having an opening sufficiently closely corresponding to the size of the end of such a punch to form a clean-cut opening without the punch and die becoming frequently wedged one within the other and moreover, due to the slight irregularities in the width of the casing to be perforated, the resulting size of the opening produced will fluctuate more than is desired when forming well casings. Thus when as in such copending application of Milon C. Trumble, Serial No. 62,190, a punch tapering entirely to the end was employed, there was used in conjunction therewith a die having an opening of considerable larger size than the end of the punch and subsequent to the punching operations it was necesary to grind away the material of the casing which was forced outward and protruded from the normal wall of the casing.

Figure 3:
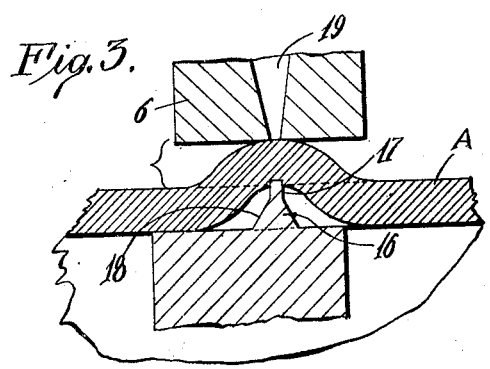
Fig. 3 is a further enlargement of the casing being perforated and the die and punch.
Figure 2:
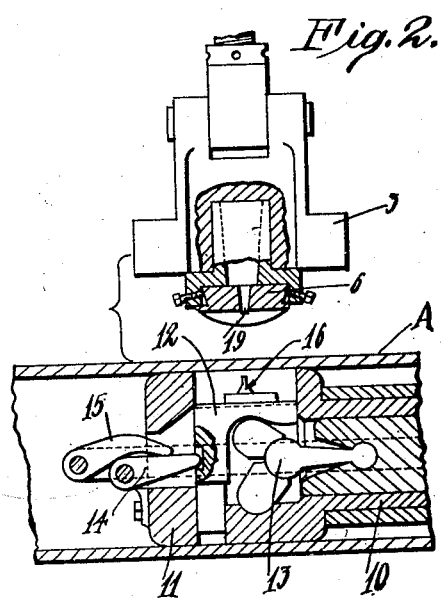
Fig. 2 is an enlarged elevation partially in vertical section of the die and punch actuating parts of said apparatus with the casing disclosed therebetween.
Figure 4:
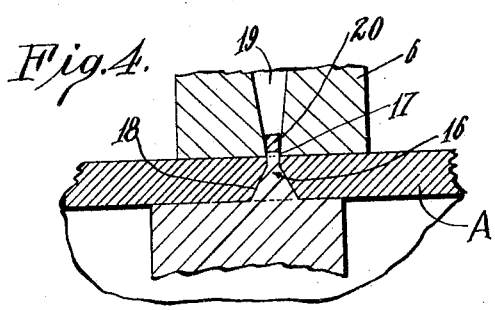
Fig. 4 is a similar fragmentary section illustrating the parts in a subsequent position.

The tapered base 18 of the punch member provides a means by which conjointly with the formation of such uniform sized openings in one operation, the material of the casing A surrounding the openings may be cold press-hardened and strengthened by a cold pressing operation. This is accomplished as follows:

The punch member 12 carrying the punch proper 16 is first forced upwardly by the rod 9 until it assumes the most advanced position wherein the punch member 12 is locked in such upward position, the toggle connection passing the center where additional pressure is prevented from being applied to the punch-operating rod 9. This motion of the punch member 12 causes the portion of the casing A in front of the advance of the punch 16 to be bulged outwardly and assumes the position illustrated in Fig. 3. The punch does not substantially perforate the casing in assuming its most upward position as the outer side of the casing A is not supported at such time. After the punch 16 assumes this punching position the die 6 then engages the bulge on the casing A thus produced and continues downwardly ironing out the casing A, and causing the casing A to assume the form shown in Fig. 4, the casing A being forced down on the punch 16 so that the punch 16 is caused to perforate the casing. The perforation of the casing is accompanied by a removal from the casing of most of the material and in advance of the straight tip 17 of the casing, this material passing into the opening 19 in the die 6 as indicated at 20. The material in advance of the tapering base 18 of the punch 16 is by this ironing-out step pressed laterally into the casing wall so that there is a resultant hardening of the walls of the casing surrounding the opening. Moreover, the perforation produced is in finished form and requires no subsequent grinding or milling.

When the die 6 and the punch member 12 are jointly actuated by a machine such as shown, the die 6 is actuated through a longer stroke than the punch member 12 in order to insure that the punch member 12 will reach the punching position in advance of the die 6.

It will be seen that, as a result of the method and means of producing a well screen from the casing A, a well screen is provided having perforations therein without requiring the screen to be made in a plurality of pieces, and a screen is provided having cold pressed walls around the perforations. Moreover, a screen is provided in which the size of the screen openings will be accurately determined by the size of the straight tip 17 of the punch 16 and that irregularities in the thickness of the casing A or other operating conditions will not in any way affect the ultimate size of such screen opening. Furthermore, the casing A may wear considerably on its outside without enlarging or decreasing the size of the screen opening therein.

While the well screen and method of producing the same herein described is well adapted for accomplishing the purposes of this invention, it is understood that various modifications may be made in the specific well screen and method and means of producing the same, and that the invention, therefore, includes all such modifications and substitutions as come within the scope of the appended claim.

I claim:

A method of perforating a casing by means of a punch and die which comprises first advancing the punch against the casing to its most extended position thereby producing a bulge in the casing around the punch, and then advancing the die against the bulge while holding the punch in fixed position in such manner as to iron out the bulge against the punch and force part of the material outwardly to form an opening and part of the material laterally to compress the walls of the opening and harden the same.

Signed at Los Angeles, California, this 17th day of September, 1925.

RICHARD C. WOODWARD.